(12) United States Patent
Lassouaoui et al.

(10) Patent No.: US 7,770,445 B2
(45) Date of Patent: Aug. 10, 2010

(54) DEVICE FOR WIND ESTIMATION AND METHOD ASSOCIATED THEREWITH

(75) Inventors: Thomas Lassouaoui, Aucamville (FR); Stephane Saint-Aroman, Toulouse (FR)

(73) Assignee: Airbus France, Toulouse (FR)

( * ) Notice: Subject to any disclaimer, the term of this patent is extended or adjusted under 35 U.S.C. 154(b) by 298 days.

(21) Appl. No.: 11/862,786

(22) Filed: Sep. 27, 2007

(65) Prior Publication Data

US 2008/0168835 A1 Jul. 17, 2008

(30) Foreign Application Priority Data

Sep. 28, 2006 (FR) .................................. 06 54001

(51) Int. Cl.
*G01P 5/00* (2006.01)
(52) U.S. Cl. .................................................. 73/170.11
(58) Field of Classification Search ........................ None
See application file for complete search history.

(56) References Cited

U.S. PATENT DOCUMENTS

| | | | | |
|---|---|---|---|---|
| 4,336,606 A | * | 6/1982 | Heard | 367/117 |
| 5,117,687 A | | 6/1992 | Gerardi | |
| 5,616,861 A | * | 4/1997 | Hagen | 73/180 |
| 6,490,510 B1 | * | 12/2002 | Choisnet | 701/14 |
| 6,894,768 B2 | * | 5/2005 | Caldwell et al. | 356/28 |
| 6,905,091 B2 | * | 6/2005 | Berson et al. | 244/1 N |
| 6,928,341 B2 | * | 8/2005 | Wise | 701/6 |
| 7,155,969 B2 | * | 1/2007 | Drutowski et al. | 73/170.14 |
| 7,197,925 B2 | * | 4/2007 | Barker-Mill | 73/170.03 |
| 7,389,686 B2 | * | 6/2008 | Thomas et al. | 73/170.02 |
| 2004/0024500 A1 | | 2/2004 | Campbell | |

FOREIGN PATENT DOCUMENTS

JP   2005-219699   8/2005

* cited by examiner

*Primary Examiner*—Lisa M Caputo
*Assistant Examiner*—Jermaine Jenkins
(74) *Attorney, Agent, or Firm*—Oblon, Spivak, McClelland, Maier & Neustadt, L.L.P.

(57) ABSTRACT

A device for an aircraft moving in an air mass relative to a terrestrial frame of reference. The device can estimate at least one characteristic of a displacement of the air mass relative to the frame of reference. The device receives an element of information about the speed of the aircraft in the frame of reference, receives at least one element of information about the speed of the aircraft in the air, and obtains the characteristic from the speed information elements. The device is capable of receiving an element of information about the angle of attack ($\alpha$) of the aircraft in the air, and is capable of determining the characteristic on the basis in particular of the angle of attack information element ($\alpha$).

17 Claims, 4 Drawing Sheets

DEVICE FOR WIND ESTIMATION AND METHOD ASSOCIATED THEREWITH

The invention relates to a device for estimating at least one component of a displacement of an air mass relative to a terrestrial frame of reference, from an aircraft moving in this air mass relative to this frame of reference. In less technical terms, it therefore relates to a device for estimating the wind from such an aircraft. The invention also relates to a method used in this type of device.

Especially during the approach and landing phases, it is desirable to be able to estimate, on board an aircraft, the force and direction of the wind, or in other words the speed and direction of displacement, relative to the ground (terrestrial frame of reference), of the air mass in which the aircraft is traveling.

This estimate is traditionally made on the basis of the speed of the aircraft relative to the ground, as determined, for example, by means of inertial data generators (such as gyrometers and accelerometers), and of the speed of the aircraft in the air (often referred to in English as "True Air Speed") measured, for example, by means of a pressure probe.

It has nevertheless been observed that the traditionally used estimation methods led to manifestly erroneous results, for example because of the difference compared with the data provided by the control tower or the disagreement between the results obtained by the two redundant channels with which aircraft are generally equipped.

With the objective of improving wind estimation on board an aircraft, and especially of making it more precise, the invention proposes a device for estimating at least one characteristic of a displacement of an air mass relative to a terrestrial frame of reference, the device being suitable as equipment in an aircraft moving in this air mass relative to this frame of reference, and comprising first means for receiving an element of information about the speed of the aircraft in the frame of reference, second means for receiving at least one element of information about the speed of the aircraft in the air, and third means for obtaining the said characteristic from the said speed information elements, characterized in that the second means are capable of receiving an element of information about the angle of attack of the aircraft in the air, and in that the third means are capable of determining the said characteristic on the basis in particular of the angle of attack information element.

In this way there is taken into account the possible inclination of the displacement of the aircraft in the air, and no longer only for the speed of this displacement; the inventors have effectively noted that, by taking the angle of attack into consideration, it was possible to derive notable consequences despite its generally low value (because of which the influence thereof on wind estimation has heretofore been regarded as negligible, even when the information element was available on board the aircraft).

According to a first embodiment that can be envisioned, the three means comprise means for estimating the angle $FPA^e_{air}$ formed between the speed vector of the aircraft in the air and a horizontal plane associated with the frame of reference according to the formula $FPA^e_{air} = \theta - \alpha.\cos \phi$, where $\alpha$ is the angle of attack information element, $\theta$ is a pitch angle of the aircraft and $\phi$ is a roll angle of the aircraft. By analogy, the three means may comprise means for estimating the orientation $TTA^e_{air}$ of the speed vector of the aircraft in the air, projected onto a horizontal plane associated with the frame of reference, according to the formula $TTA^e_{air} = \psi - \alpha.\sin \phi$, where $\alpha$ is the angle of attack information element, $\psi$ is the orientation of the aircraft in the horizontal plane and $\phi$ is a roll angle of the aircraft.

The use of these simplified formulas makes it possible to obtain the estimated values of the angle $FPA^e_{air}$ and of the orientation $TTA^e_{air}$ relatively simply, while taking the angle of attack information element into account.

The second means may also be capable of receiving an element of information about side slip of the aircraft in the air, in which cases the three means may determine the said characteristic on the basis in particular of the side-slip information element.

In this case, wind estimation is even more precise, by virtue of the fact that the side-slip information element is taken into account.

In this connection, the three means may comprise means for estimating the angle $FPA_{air}$ formed between the speed vector of the aircraft in the air and a horizontal plane associated with the frame of reference according to the formula $FPA_{air} = \theta - \alpha.\cos \phi - \beta.\sin \phi$, where $\alpha$ is the angle of attack information element, $\beta$ is the side-slip information element, $\theta$ is a pitch angle of the aircraft and $\phi$ is a roll angle of the aircraft. Similarly, the three means may comprise means for estimating the orientation $TTA_{air}$ of the speed vector of the aircraft in the air, projected onto a horizontal plane associated with the frame of reference, according to the formula $TTA_{air} = \psi - \alpha.\sin \phi\beta + \beta.\cos \phi$, where $\alpha$ is the angle of attack information element, $\beta$ is the side-slip information element, $\psi$ is the orientation of the aircraft in the horizontal plane and $\phi$ is a roll angle of the aircraft.

The use of simplified formulas makes it possible to take the angle of attack and side slip into account without greatly complicating the calculations performed.

Alternatively, the three means may comprise means for determining at least one component of the projection, onto a horizontal plane associated with the frame of reference, of the speed vector of the aircraft in the air, according to the said element of information about the speed of the aircraft in the air, the said angle of attack information element, the said side-slip information element, an information element representative of a pitch angle of the aircraft and an information element representative of a roll angle of the aircraft, for example according to formula (2) presented farther on, which makes it possible to deduce therefrom a very precise estimate of the wind.

The invention also proposes a system intended to be installed on board an aircraft and comprising a device such as mentioned hereinabove, supplemented with means for generating the said element of information about the speed of the aircraft in the frame of reference on the basis in particular of data received from a satellite positioning system.

The speed of the aircraft in the differential determined in this way is therefore a reliable datum, without risk of drift.

The means for generating the said element of information about the speed of the aircraft in the frame of reference may additionally generate this information element on the basis of data received from at least one inertial sensor, thus making it possible to increase the precision of this datum while preserving its reliable character by virtue of the joint use of data received from the satellite positioning system and of those provided by the inertial sensor or sensors.

The invention also proposes a method for estimation of at least one characteristic of a displacement of an air mass relative to a terrestrial frame of reference from an aircraft moving in this air mass relative to this frame of reference, characterized in that it comprises the following steps:

reception of an element of information about the speed of the aircraft in the frame of reference;

reception of an element of information about the speed of the aircraft in the air;

reception of an element of information about the angle of attack of the aircraft in the air;

acquisition of the said characteristic on the basis of the said speed information elements and of the angle of attack information element.

Such a method may optionally include steps and characteristics corresponding to those mentioned hereinabove in terms of device, and the advantages derived therefrom.

Finally, the invention proposes an aircraft comprising a device such as mentioned hereinabove or capable of implementing the method just mentioned.

Other characteristics and advantages of the invention will become apparent in the light of the description hereinafter with reference to the attached drawings, wherein.

There will now be described three practical examples of the invention within the on-board system represented in FIG. 1 and described hereinafter. However, the invention naturally can be employed in systems having configurations different from those presented in FIG. 1.

Figure 1:
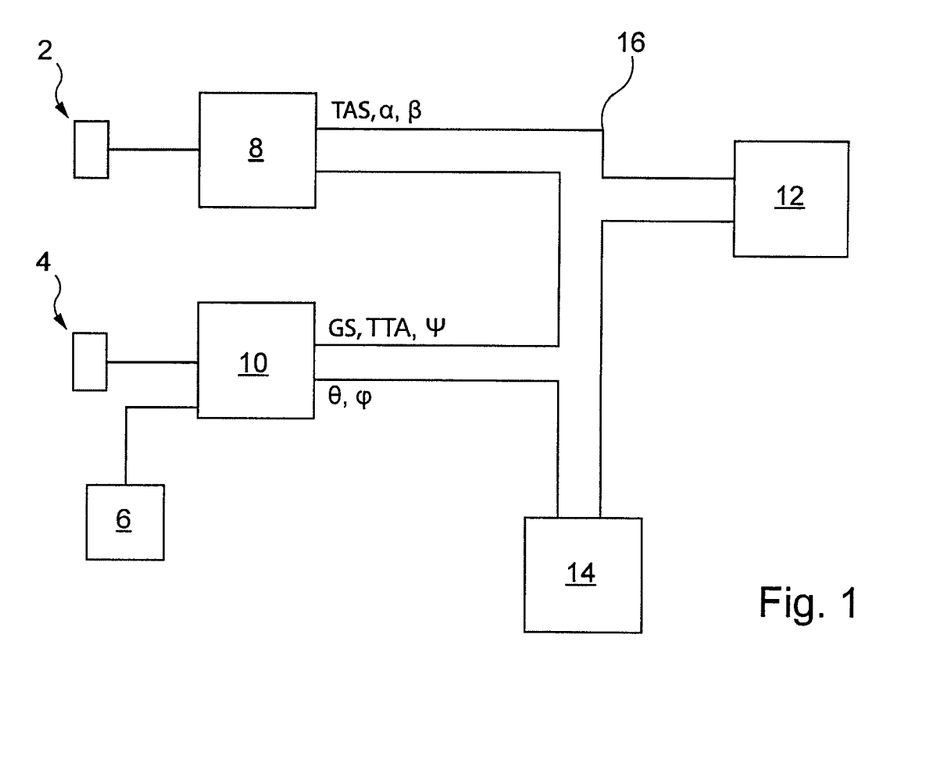
FIG. 1 represents a system installed on board an aircraft and comprising a device according to the teachings of the invention.

FIG. 1 represents elements installed on board an aircraft and useful to understanding of the embodiments presented hereinafter.

The on-board system comprises a set of anemometric sensors 2 (represented generally by a rectangle for simplicity) capable of delivering information elements relating to the displacement of the aircraft in the air mass through which it is traveling at a given instant. These anemometric sensors comprise, for example, a static pressure probe and a total pressure probe, from which it is possible to determine the air speed (or TAS, from the English "True Air Speed"), an angle of attack probe ("Angle of Attack probe" in English) and a side-slip angle probe ("Side Slip Angle probe" in English).

It is noted that the air speed is the norm (or module) of the displacement (or speed) vector of the airplane in the air mass.

The information elements delivered by anemometric sensors 2 are processed in an anemometric data generator 8, sometimes known as ADR (from the English "Air Data Reference"), which on this basis generates the following digital information elements:

an air speed information element TAS (that is, as already indicated, corresponding to the norm of the vector $\vec{TAS}$ expressing the speed of the aircraft in the air mass);

an angle of attack information element α representative of the angle of attack of the vector $\vec{TAS}$ relative to a horizontal plane $P_a$ associated with the aircraft ("wing plane" for an airplane);

a side-slip information element β representative of the side-slip angle, or in other words the angle between the speed vector $\vec{TAS}$ of the aircraft in the air and a vertical plane $P_s$ associated with the aircraft and including the axis of the fuselage thereof (or "aircraft symmetry plane").

Figure 2:
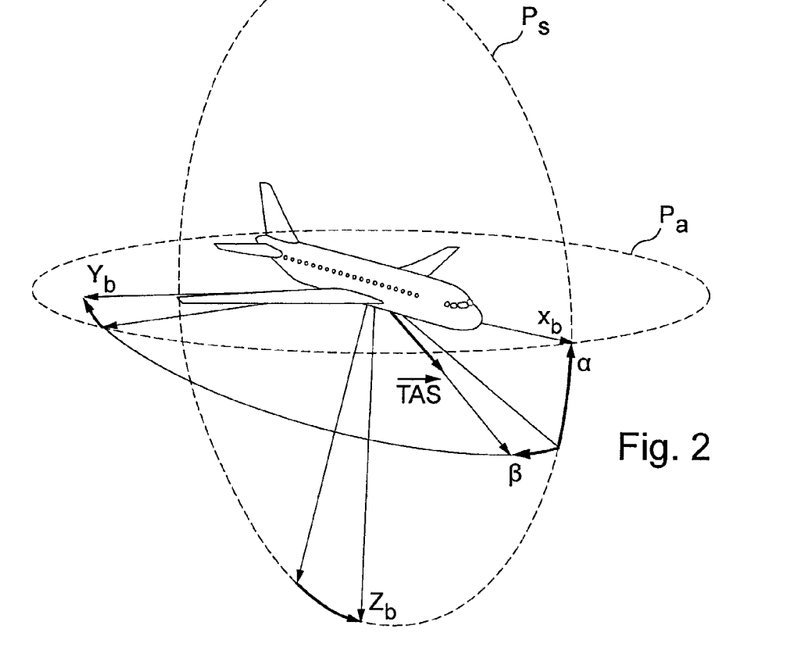
FIG. 2 represents the air-speed vector of an aircraft and the angles involved.

FIG. 2 illustrates the positioning of the different angles mentioned hereinabove in order to define the position of the air-speed vector $\vec{TAS}$ relative to the aircraft.

The on-board system of FIG. 1 also comprises a set of inertial sensors 4 for determining the movement of the aircraft relative to the terrestrial frame of reference. These sensors comprise, for example, three gyrometers and three accelerometers.

The on-board system also comprises a satellite positioning system 6 (for example, of the GPS or "Global Positioning System" type), capable of obtaining elements of information about the geographic location of the aircraft on the basis of data received from satellites orbiting the globe.

A processing unit of the terrestrial reference 10 (traditionally referred to as inertial data generator or IR for the English "Inertial Reference", but which may also make use of data provided by the satellite positioning system, as described hereinafter) receives and processes the information elements issued on the one hand from the set of inertial sensors 4 and on the other hand from satellite positioning system 6, and delivers in particular the following digital information elements:

the ground speed GS (from the English "Ground Speed"), which is the norm of the projection, in the horizontal plane at the location under consideration, of the speed vector of the aircraft relative to the terrestrial frame of reference;

the azimuth TTA (from the English "True Track Angle"), which corresponds to the direction of the projection, in this same horizontal plane, of the speed of the aircraft in the terrestrial frame of reference;

the geographic heading ψ ("True Heading" in English), which corresponds to the orientation of the aircraft in the horizontal plane;

the pitch angle θ ("Pitch Angle" in English) of the aircraft;

the roll angle φ ("Roll Angle" in English) of the aircraft.

Figure 3:
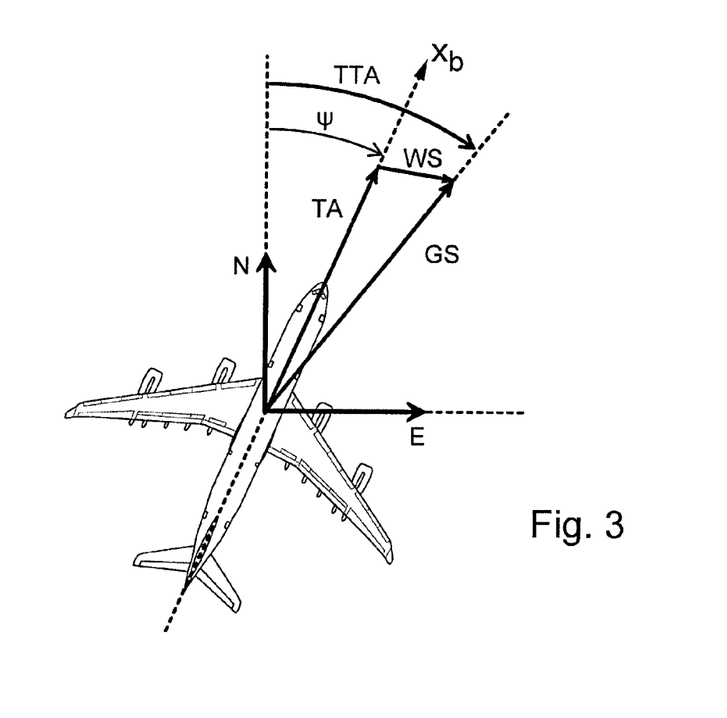
FIG. 3 represents the relative position of vectors and angles projected onto the horizontal plane.

FIG. 3 illustrates the position of different elements and the definition of angles between those in the horizontal plane associated with the terrestrial frame of reference as mentioned hereinabove.

As an example, processing unit 10 uses, as basis for determining the foregoing information elements:

a combination of the data furnished by inertial sensors 4 and the data furnished by satellite positioning system 6, for example by means of Kalman filters, in which case the information elements delivered by processing unit 10 are said to be "hybridized";

the data furnished by inertial sensors 4 alone when satellite positioning system 6 is not operating (for example, because the aircraft is located in a zone in which the exchanges necessary with satellites are impossible).

The use of hybridized positioning data is actually preferred, because they are more precise.

Alternatively, the invention naturally may be used in a system comprising only inertial sensors 4 (or else only satellite positioning system 6) as the source of positioning data.

It can be noted that anemometric data generator 8 and terrestrial reference processing unit 10 can be grouped inside the same electronic box, known as the ADIRU (from the English "Air Data and Inertial Reference Unit").

Moreover, although a single example of each unit is represented in FIG. 1, it is possible to use two or three of each unit in order to obtain a redundant architecture, as is common in aeronautics.

Units 8, 10 described hereinabove are connected, for example by means of an avionic network 16, which permits the exchange of data between the different units connected thereto, to a wind-estimating device 12, possible examples of operation of which are described hereinafter.

Wind-estimating device 12 comprises, for example, a microprocessor acting under the control of a program which, when activated, permits in particular the reception of data of different units 8, 10, the execution of calculations based on these data and conforming with the examples given hereinafter, and the emission of data representative of the estimated wind, for example toward a display device 14 situated in the flight deck of the aircraft and also associated with avionic network 16.

Naturally other architectures can also be envisioned, as already indicated, for the wind-estimating device (for example, a dedicated integrated circuit, possibly in the form of an ASIC, or in other words an application-specific integrated circuit), and also for the system as a whole (for example, the exchange of information elements can take place by means of analog links instead and in place of the avionic data-exchange network).

According to a first embodiment, wind-estimating unit 12 determines the speed vector of the wind (or in other words of the air mass in which the aircraft is traveling) in the terrestrial frame of reference by exact calculation of the vector difference between the speed vector of the aircraft relative to the ground and the speed vector of the aircraft in the air mass.

Naturally the different vectors (and in particular the wind-speed vector) can be represented by their different components, and the calculations can be applied to these components as now explained.

On the basis of values mentioned hereinabove and provided by the anemometric data generator, the speed vector $\vec{TAS}$ of the aircraft in the air mass is expressed as follows in a coordinate system $R_b=[x_b, y_b, z_b]$ associated with the aircraft (with $x_b$ the axis of the aircraft's fuselage, $y_b$ a perpendicular direction in the horizontal plane associated with the aircraft and $z_b$ the direction perpendicular to the two preceding directions and oriented downward, as shown in FIG. 2):

$$\vec{V}_{TAS}[R_b] = TAS \cdot \begin{bmatrix} \cos\alpha \cdot \cos\beta \\ \sin\beta \\ \sin\alpha \cdot \cos\beta \end{bmatrix}. \quad (1)$$

Figure 4:
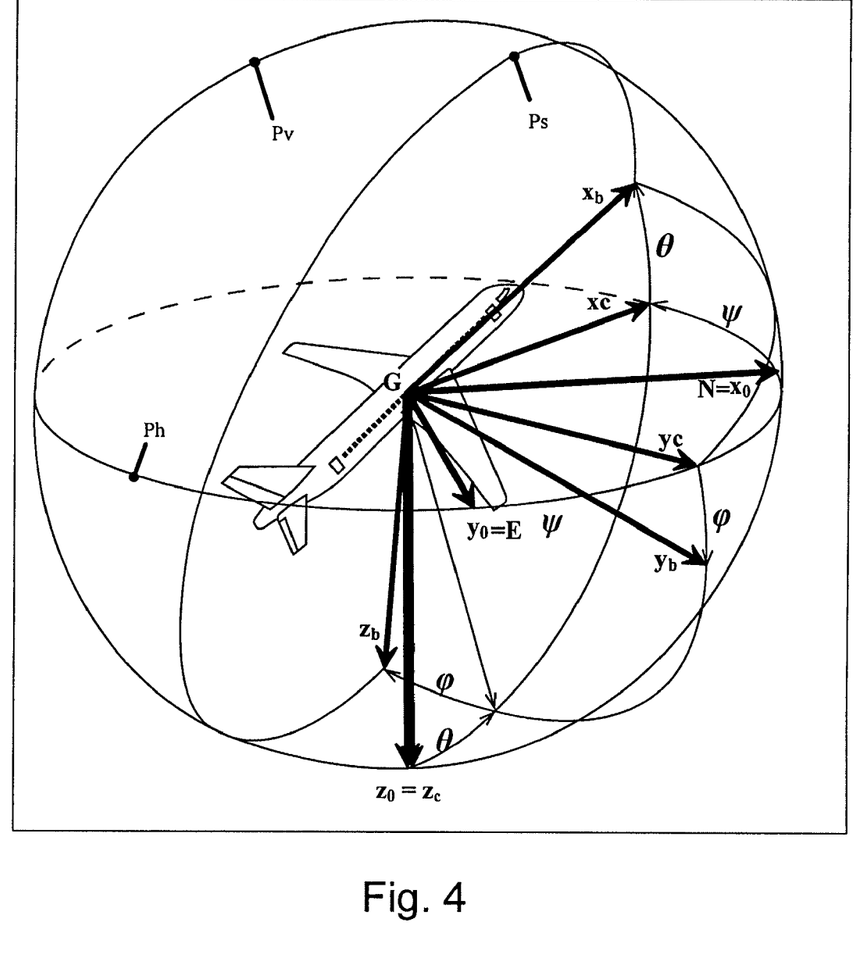
FIG. 4 represents the relative position of different coordinate systems, including an intermediate coordinate system used in the first embodiment.

To simplify the calculation of the vector difference, it is placed an intermediate coordinate system $R_c=[x_c, y_c, z_c]$, which corresponds to the coordinate system $R_b$ associated with the aircraft, transposed along the horizontal and vertical directions into the terrestrial frame of reference (the axes $x_c$ and $y_c$ are in the horizontal plane $P_h$ in the terrestrial frame of reference): the axes $x_b$ and $x_c$ form an angle equal to the pitch angle $\theta$ of the aircraft, while the axes $y_b$ and $y_c$ form an angle equal to the roll angle $\phi$ of the aircraft, as illustrated in FIG. 4.

In this intermediate coordinate system $R_c$, the aircraft-speed vector $\vec{TAS}$ in the air mass is expressed as follows:

$$\vec{V}_{TAS}[R_c] = TAS \cdot \begin{bmatrix} \cos\alpha \cdot \cos\beta \cdot \cos\theta + \sin\beta \cdot \sin\theta \cdot \sin\varphi + \\ \sin\alpha \cdot \cos\beta \cdot \cos\varphi \cdot \sin\theta \sin\beta \cdot \\ \cos\varphi - \sin\alpha \cdot \cos\beta \cdot \sin\varphi \sin\alpha \cdot \\ \cos\beta \cdot \cos\theta \cdot \cos\varphi + \sin\beta \cdot \cos\theta \cdot \sin\varphi - \\ \cos\alpha \cdot \cos\beta \cdot \sin\theta \end{bmatrix} \quad (2)$$

$$= \begin{bmatrix} V_{TAS\_xc} \\ V_{TAS\_yc} \\ V_{TAS\_zc} \end{bmatrix}.$$

In this same coordinate system $R_c$, the aircraft-speed vector relative to the ground is expressed as:

$$\vec{V}_{GS}[R_c] = GS \cdot \begin{bmatrix} \cos(TTA - \psi) \\ \sin(TTA - \psi) \\ \ldots \end{bmatrix}. \quad (3)$$

Only the two first components, or in other words those in the horizontal plane $P_h$, are taken into account here, since the only objective here is to determine the horizontal component (force and direction) of the wind.

By simple difference of the two preceding vector expressions, there are obtained the components $V_{wind\_xc}$ and $V_{wind\_yc}$ of the wind in the horizontal plane:

with $V_{Wind\_xc}=TAS.(\cos\alpha.\cos\beta.\cos\theta+\sin\beta.\sin\theta.\sin\phi+\sin\alpha.\cos\beta.\cos\phi.\sin\theta)-GS.\cos(TTA-\psi)$ and $V_{Wind\_yc}=TAS.(\sin\beta.\cos\phi-\sin\alpha.\cos\beta.\sin\phi)-GS.\sin(TTA-\psi)$ (4).

Therefrom there is then readily deduced the wind speed (or in other words the norm of the projection of the wind vector in the horizontal plane $P_h$):

$$V_{wind\_h} = \sqrt{V_{Wind\_xc}^2 + V_{Wind\_yc}^2},$$

as well as the wind direction:

$$\psi_{wind\_h} = \arctan\left(\frac{V_{Wind\_yc}}{V_{Wind\_xc}}\right) + \psi + \pi(\bmod 2\pi)$$

(relative to compass direction North).

Figure 5:
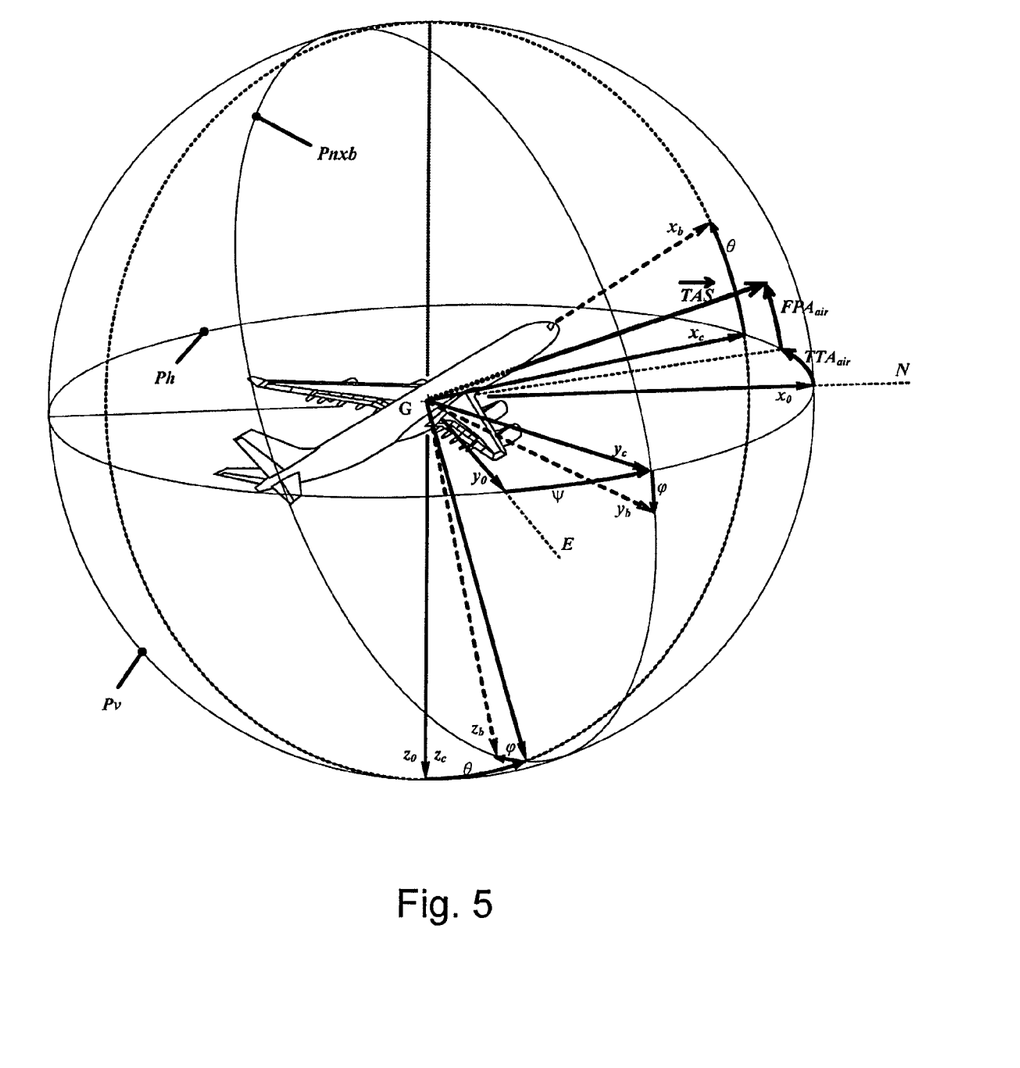
FIG. 5 represents the relative position of different angles, coordinate systems and vectors, useful in particular to understanding of the second and third embodiments.

According to a second embodiment, wind-estimating unit 12 determines the wind-speed vector by being placed in a coordinate system associated with the ground and by using approximate values of angles that define, in this coordinate system, the aircraft-speed vector $\vec{TAS}$ in the air, as represented in FIG. 5.

More precisely, the angle $FPA_{air}$ between the vector $\vec{TAS}$ and the terrestrial horizontal plane (so named for the initials of "Flight Path Angle Air") and the heading $TTA_{air}$ of the vector $\vec{TAS}$ projected onto the terrestrial horizontal plane $P_h$ (for the initials of "True Track Angle Air") can be approximated as follows under the following commonly encountered conditions:
- the angle of attack α is small (on the order of a few degrees);
- the side-slip angle β is small (on the order of a few degrees);
- the angle $FPA_{air}$ (which has just been defined) is small (on the order of a few degrees);
- the pitch angle θ is small (on the order of a few degrees).

Starting from the exact value of the vector in the intermediate coordinate system (equation 2 hereinabove), the exact expression of the angle $FPA_{air}$ is as follows:

$$FPA_{air} = \arctan\left(\frac{-V_{TAS\_zc}}{\sqrt{V_{TAS\_xc}^2 + V_{TAS\_yc}^2}}\right),$$

from which (by substituting the expressions of equation 2):

$$\tan FPA_{air} = \frac{-\sin\alpha \cdot \cos\beta \cdot \cos\varphi \cdot \cos\theta - \sin\beta \cdot \cos\theta \cdot \sin\varphi + \cos\alpha \cdot \cos\beta \cdot \sin\theta}{\sqrt{\begin{array}{l}(\sin\beta \cdot \cos\varphi - \sin\alpha \cdot \cos\beta \cdot \sin\varphi)^2 + \\ (\cos\alpha \cdot \cos\beta \cdot \cos\theta + \sin\beta \cdot \sin\theta \cdot \sin\varphi + \\ \sin\alpha \cdot \cos\beta \cdot \cos\varphi \cdot \sin\theta)^2\end{array}}}$$

Under the conditions indicated hereinabove, it is possible to make the following approximations (on the first order):

sin α≈α and cos α≈1;
sin β≈β and cos β≈1;
sin θ≈θ and cos θ≈1;
tan $FPA_{air}$≈$FPA_{air}$.

Therefrom there is deduced the following simplified expression:

$$FPA_{air} \approx \frac{-\alpha \cdot \cos\varphi - \beta \cdot \sin\varphi + \theta}{\sqrt{(\beta \cdot \cos\varphi - \alpha \cdot \sin\varphi)^2 + (1 + \beta \cdot \theta \cdot \sin\varphi + \alpha \cdot \theta \cdot \cos\varphi)^2}}$$

Disregarding the terms of order higher than 1 in the denominator, there is finally obtained the approximate expression, which will be used for determination of the wind:

$FPA_{air}$≈θ−α.cos φ−β.sin φ

According to an analogous method, there can be deduced from equation 2 hereinabove the following exact expression for the angle $TTA_{air}$:

$$TTA_{air} - \psi = \arctan\left(\frac{V_{TAS\_yc}}{V_{TAS\_xc}}\right), \text{ or in other words}$$

$$TTA_{air} - \psi = \arctan\left(\frac{\sin\beta \cdot \cos\varphi - \sin\alpha \cdot \cos\beta \cdot \sin\varphi}{\cos\alpha \cdot \cos\beta \cdot \cos\theta + \sin\beta \cdot \sin\theta \cdot \sin\varphi + \sin\alpha \cdot \cos\beta \cdot \cos\varphi \cdot \sin\theta}\right)$$

By approximation to the first order under the conditions seen hereinabove, it is considered that:

sin α≈α and cos α≈1;
sin β≈β and cos β≈1;
sin θ≈θ and cos θ≈1;
tan $FPA_{air}$≈$FPA_{air}$;
from which $$TTA_{air} - \psi \approx \arctan\left(\frac{\beta \cdot \cos\varphi - \alpha \cdot \sin\varphi}{1 + \beta \cdot \theta \cdot \sin\varphi + \alpha \cdot \theta \cdot \cos\varphi}\right).$$

Disregarding the terms of order higher than 1 in the denominator, there is obtained:

$TTA_{air}$≈ψ+arctan [β.cos φ−α.sin φ]

Knowing that α and β are small, it can be considered that:

arctan [β.cos φ−α.sin φ]≈β.cos φ−α.sin φ, from which the approximate expression used in determination of the wind becomes:

$TTA_{air}$≈ψ−α.sin φ+β.cos φ.

Once the angles $TTA_{air}$ and $FPA_{air}$ have been estimated by means of the approximate formulas just presented, the wind components in the horizontal plane are obtained by subtracting the speed of the aircraft relative to the ground and the speed of the aircraft in the air, the latter being expressed by means of the estimated angles $TTA_{air}$ and $FPA_{air}$:

$V_{Wind\_E}$=GS.sin TTA−TAS.cos($FPA_{air}$).sin($TTA_{air}$)

$V_{Wind\_N}$=GS.cos TTA−TAS.cos($FPA_{air}$).cos($TTA_{air}$)

The wind speed and direction are then obtained respectively by:

$$V_{Wind\_h} = \sqrt{V_{Wind\_E}^2 + V_{Wind\_N}^2} \text{ et}$$

$$\psi_{Wind\_h} = \arctan\left(\frac{V_{Wind\_E}}{V_{Wind\_N}}\right) + \pi (\mathrm{mod}\, 2\pi).$$

It can be noted that this embodiment permits relatively simple calculations for determination of the wind, thus making it possible to run the calculations in a traditional microprocessor within a reasonable time.

The formulas used hereinabove for estimation of the angles $TTA_{air}$ and $FPA_{air}$ also have the advantage that they clearly illustrate the benefit of taking the angle of attack α and side-slip angle β into account for determination of the wind, by comparison with the solutions in which these angles are disregarded (or in other words in which there are actually used θ as the estimate of $FPA_{air}$ and ψ as the estimate of $TTA_{air}$).

According to a third practical example, wind-estimating unit 12 determines the wind-speed vector by being placed in a coordinate system associated with the ground and by using approximate values of the angles defining, in this coordinate system, the aircraft-speed vector $\vec{TAS}$ in the air, while nevertheless disregarding the contribution of the side-slip angle β. There are therefore used the estimated formulas for $TTA_{air}$ and $FPA_{air}$ proposed in the second practical example presented hereinabove, with β=0.

According to this third practical example, the wind components are therefore estimated on the basis of different data received from units 8, 10 by means of the following calculations:

$TTA_{air}^e$=ψ−α.sin φ;

$FPA_{air}^e$=θ−α.cos φ;

$V_{Wind\_E} = GS.\sin TTA - TAS.\cos(FPA_{air}^e).\sin(TTA_{air}^e)$ $V_{Wind\_N} = GS.\cos TTA - TAS.\cos(FPA_{air}^e).\cos(TTA_{air}^e).$ The wind speed and direction are then obtained from these two components as in the second embodiment.

It is noted that this third embodiment proposes even simpler calculations for wind estimation. In addition, the absence of side-slip angle in the calculations makes it possible to implement this solution in aircraft not equipped with means for determining the side-slip angle.

As already indicated, the foregoing examples are only some of the possible implementations of the invention.

The invention claimed is:

1. A device for estimating at least one characteristic of a displacement of an air mass relative to a terrestrial frame of reference, the device being suitable as equipment in an aircraft moving in said air mass relative to said frame of reference and comprising:
   first means for receiving an element of information representative of the speed of the aircraft relative to the frame of reference;
   second means for receiving at least one element of information representative of the speed of the aircraft relative to the air;
   third means for obtaining said characteristic from said speed information elements;
   wherein the second means is configured to receive an element of information representative of the angle of attack of the aircraft relative to the air and the third means is configured to determine said characteristic on the basis of at least the element of information representative of the angle of attack.

2. A device according to claim 1, wherein the third means comprise means for estimating the angle $FPA_{air}^e$ formed between the speed vector of the aircraft in the air and a horizontal plane associated with the frame of reference according to the formula $FPA_{air}^e = \theta - \alpha.\cos\phi$, where $\alpha$ is the angle of attack information element, $\theta$ a pitch angle of the aircraft and $\phi$ a roll angle of the aircraft.

3. A device according to claim 1 or 2, wherein the third means comprise means for estimating the orientation $TTA_{air}^e$ of the speed vector of the aircraft in the air, projected onto a horizontal plane associated with the frame of reference, according to the formula $TTA_{air}^e = \psi - \alpha.\sin\phi$, where $\alpha$ is the angle of attack information element, $\psi$ the orientation of the aircraft in the horizontal plane and $\phi$ a roll angle of the aircraft.

4. A device according to claim 1, wherein the second means are capable of receiving an element of information element about the side slip of the aircraft in the air, and wherein the third means are capable of determining the said characteristic on the basis in particular of the side-slip information element.

5. A device according to claim 4, wherein the third means comprise means for estimating the angle $FPA_{air}$ formed between the speed vector of the aircraft in the air and a horizontal plane associated with the frame of reference according to the formula $FPA_{air} \approx \theta - \alpha.\cos\phi - \beta.\sin\phi$, where $\alpha$ is the angle of attack information element, $\beta$ is the side-slip information element, $\theta$ a pitch angle of the aircraft and $\phi$ a roll angle of the aircraft.

6. A device according to claim 4 or 5, wherein the third means comprise means for estimating the orientation $TTA_{air}$ of the speed vector of the aircraft in the air, projected onto a horizontal plane associated with the frame of reference, according to the formula $TTA_{air} = \psi - \alpha.\sin\phi + \beta.\cos\phi$, where $\alpha$ is the angle of attack information element, $\beta$ the side-slip information element, $\psi$ the orientation of the aircraft in the horizontal plane and $\phi$ a roll angle of the aircraft.

7. A device according to claim 4, wherein the third means comprise means for determining at least one component of the projection, onto a horizontal plane associated with the frame of reference, of the speed vector of the aircraft in the air, according to said element of information about the speed of the aircraft in the air, said angle of attack information element, said side-slip information element, an information element representative of a pitch angle of the aircraft and an information element representative of a roll angle of the aircraft.

8. A system intended to be installed on board an aircraft and comprising a device according to claim 1, further comprising means for generating said element of information about the speed of the aircraft in the frame of reference on the basis of data received from a satellite positioning system.

9. A system according to claim 8, wherein the means for generating said element of information about the speed of the aircraft in the frame of reference are capable of generating this information element on the basis also of data received from at least one inertial sensor.

10. An aircraft comprising a device according to claim 1.

11. A method for estimation of at least one characteristic of a displacement of an air mass relative to a terrestrial frame of reference from an aircraft moving in this air mass relative to this frame of reference, said method comprising the following steps:
    receiving an element of information representative of the speed of the aircraft relative to the frame of reference;
    receiving an element of information representative of the speed of the aircraft relative to the air;
    receiving an element of information representative of the angle of attack of the aircraft relative to the air;
    obtaining said characteristic on the basis of said speed information elements and of the angle of attack information element.

12. A method according to claim 11, further comprising a step of estimating the orientation $TTA_{air}^e$ of the speed vector of the aircraft in the air, projected onto a horizontal plane associated with the frame of reference, according to the formula $TTA_{air}^e = \psi - \alpha.\sin\phi$, where $\alpha$ is the angle of attack information element, $\psi$ the orientation of the aircraft in the horizontal plane and $\phi$ a roll angle of the aircraft.

13. A method according to claim 11, further comprising a step of receiving an element of information about the side slip of the aircraft in the air, the step of obtaining said characteristic being accomplished additionally on the basis of the side-slip information element.

14. A method according to claim 13, further comprising a step of estimating the orientation $TTA_{air}$ of the speed vector of the aircraft in the air, projected onto a horizontal plane associated with the frame of reference, according to the formula $TTA_{air} = \psi - \alpha.\sin\phi + \beta.\cos\phi$, where $\alpha$ is the angle of attack information element, $\beta$ the side-slip information element, $\psi$ the orientation of the aircraft in the horizontal plane and $\phi$ a roll angle of the aircraft.

15. A method according to claim 13, further comprising a step of determining at least one component of the projection, onto a horizontal plane associated with the frame of reference, and a step of determining the speed vector of the aircraft in the air, according to said element of information about the speed of the aircraft in the air, said angle of attack information element, said side-slip information element, an information element representative of a pitch angle of the aircraft and an information element representative of a roll angle of the aircraft.

16. A method according to one of claims 11 to 15, wherein the element of information about the speed of the aircraft in the frame of reference is generated on the basis of data received from a satellite positioning system.

17. An aircraft comprising a device capable of implementing a method according to claim 11.

* * * * *